US012757913B2

(12) United States Patent
Laroche et al.

(10) Patent No.: US 12,757,913 B2
(45) Date of Patent: Oct. 13, 2026

(54) GELLING LEGUMINOUS PLANT PROTEIN

(71) Applicant: ROQUETTE FRERES, Lestrem (FR)

(72) Inventors: Christophe Laroche, Fougeres (FR); Lucile Calmon, Lille (FR)

(73) Assignee: Roquette Freres, Lestrem (FR)

( * ) Notice: Subject to any disclaimer, the term of this patent is extended or adjusted under 35 U.S.C. 154(b) by 1035 days.

(21) Appl. No.: 17/594,690

(22) PCT Filed: Apr. 29, 2020

(86) PCT No.: PCT/FR2020/050726
§ 371 (c)(1),
(2) Date: Oct. 26, 2021

(87) PCT Pub. No.: WO2020/221978
PCT Pub. Date: Nov. 5, 2020

(65) Prior Publication Data

US 2022/0192220 A1 Jun. 23, 2022

(30) Foreign Application Priority Data

Apr. 29, 2019 (FR) ..................................... 19 04521

(51) Int. Cl.
*A23J 1/14* (2006.01)
*A23J 3/14* (2006.01)
*A23J 3/22* (2006.01)
*A23L 13/40* (2023.01)
*A23L 33/185* (2016.01)

(52) U.S. Cl.
CPC . *A23J 1/14* (2013.01); *A23J 3/14* (2013.01); *A23J 3/227* (2013.01); *A23L 13/426* (2016.08); *A23L 33/185* (2016.08)

(58) Field of Classification Search
CPC ... A23J 1/14; A23J 3/14; A23L 13/426; A23L 33/185
See application file for complete search history.

(56) References Cited

U.S. PATENT DOCUMENTS 4,060,203 A 11/1977 Edwards et al.
2005/0084592 A1* 4/2005 Aldred .................... A23L 33/21 426/573
2008/0254168 A1* 10/2008 Mueller .................. A23L 33/20 426/651
2009/0155444 A1* 6/2009 Yakubu ................... A23L 7/115 426/621
2017/0238590 A1* 8/2017 Bansal-Mutalik ...... A23J 1/148

FOREIGN PATENT DOCUMENTS

| | | | |
|---|---|---|---|
| EP | 1400537 | A1 | 3/2004 |
| FR | 2889416 | A1 | 2/2007 |
| JP | S55131351 | A | 10/1980 |
| WO | 0037485 | A1 | 6/2000 |
| WO | 2011124862 | A1 | 10/2011 |

OTHER PUBLICATIONS

Liu Bohui, et al., "Ball-milling changed the physicochemical properties of SPI and its cold-set gels", Journal of Food Engineering, Barking, Essex, GB, vol. 195, Oct. 4, 2016 (Oct. 4, 2016), pp. 158-165 DOI: 10.1016/J.JFOODENG.2016.10.006 ISSN: 0260-8774, XP029805485; figures 2C, 4A, 4B p. 163, paragraphs 3.9, 3.10 p. 164, paragraph 4.

Isao Hayakawa, et al., "Microparticulation by Jet Mill Grinding of Protein Powders and Effects on Hydrophobicity", Journal of Food Science, US, vol. 58, No. 5, Sep. 1, 1993 (Sep. 1, 1993), pp. 1026-1029 DOI: 10.I I I I /.1365-2621.1993.tb06104.x ISSN: 0022-1147, XP055678477; Microparticulation; p. 1027, left-hand column figure 3c.

Sun Chanchan, et al., "Reduction of particle size based on superfine grinding: Effects on structure, rheological and gelling properties of whey protein concentrate", Journal of Food Engineering, vol. 186, Oct. 2016 (Oct. 2016), pp. 69-76 XP055678355; 4. Conclusions; p. 74, right-hand column.

Bastistaa et al., "Accessing gelling ability of vegetable proteins using rheological and fluorescence techniques", International Journal of Biological Macromolecules 36 (2005) 135-143, 2005.

A. Fernández-Quintela et al., "Composition and functional properties of protein isolates obtained from commercial legumes grown in northern Spain," Plant Foods for Human Nutrition, vol. 51, pp. 331-341, Dec. 1997.

* cited by examiner

*Primary Examiner* — Jenna A Watts

(57) ABSTRACT

The invention relates to a leguminous plant protein composition having improved gel strength at neutral pH, and also the process for producing same.

18 Claims, No Drawings

GELLING LEGUMINOUS PLANT PROTEIN

TECHNICAL FIELD

The invention relates to the field of plant proteins, in particular of leguminous plant protein isolates, even more particularly of pea protein isolates.

PRIOR ART

Human daily protein requirements are between 12% and 20% of food intake. These proteins are supplied both by products of animal origin (meat, fish, eggs, dairy products) and by products of plant origin (cereals, leguminous plants, algae).

However, in industrialized countries, protein intakes are predominantly in the form of proteins of animal origin. However, many studies demonstrate that excessive consumption of proteins of animal origin to the detriment of plant proteins is one of the causes of increase in cancers and cardiovascular diseases.

Moreover, animal proteins have many drawbacks, both in terms of their allergenicity, notably regarding proteins from milk or eggs, and in environmental terms, in connection with the harmful effects of intensive farming.

There is thus a growing demand from manufacturers for compounds of plant origin having advantageous nutritional and functional properties without, however, having the drawbacks of compounds of animal origin.

Soybean has been, and still is, the main plant alternative to animal proteins. However, the use of soybean presents certain drawbacks. The origin of soybean seeds is more often than not from GMOs and the production of its protein proceeds via a de-oiling step which uses solvent.

Since the 1970s, the development of pulse plants, in particular including pea, in Europe and mainly in France, has dramatically increased as an alternative protein resource to animal proteins for animal and human food consumption. Pea contains about 27% by weight of protein matter. The term "pea" is considered here in its broadest sense and includes in particular all wild-type varieties of "smooth pea" and all mutant varieties of "smooth pea" and of "wrinkled pea", irrespective of the uses for which said varieties are generally intended (food for human consumption, animal feed and/or other uses). These seed are non-GMOs and do not require a de-oiling step using solvents.

Pea protein, predominantly pea globulin, has been extracted and profitably exploited industrially for many years. An example of a pea protein extraction process that may be mentioned is patent EP 1 400 537. In this process, the seed is milled in the absence of water ("dry milling" process) in order to obtain a meal. This meal is subsequently suspended in water in order to extract the protein therefrom. Other processes for extracting leguminous plant proteins are also described in U.S. Pat. No. 4,060,203 A, FR2889416 A1 and WO 2011/124862 A1. Patent JP55-131351 A describes the manufacture of a soybean protein isolate in which a meal, in the form of fines particles, is made into an aqueous solution, and a protein fraction is precipitated by adjusting said aqueous solution to an acidic pH. The precipitated protein solution is then neutralized before being heat-treated, and optionally atomized, in order to form a soybean protein isolate.

However, leguminous plant proteins, and in particular pea proteins, have gelling properties which are markedly inferior to those of soybean. As presented in "Accessing gelling ability of vegetable proteins using rheological and fluorescence techniques" (Bastistaa et al., International Journal of Biological Macromolecules 36 (2005) 135-143, 2005), pea and lupin proteins are presented as less gelling than soybean protein.

It is therefore advantageous to obtain a leguminous plant protein, in particular a leguminous plant protein isolate, even more particularly a pea protein isolate, presenting an improvement in gelling power or gel strength. These leguminous plant proteins may be incorporated into food or pharmaceutical products. These products may have very variable pH values, ranging from 4 to 9. However, in numerous applications, such as meat or fish substitutes, these proteins are used at a "neutral pH", i.e. a pH ranging from about 6 to about 8. By way of example, mention may be made of meat or fish substitutes in which such proteins are useful for making other textured proteins adhere together after gelling. Therefore, the ability to provide novel leguminous plant proteins presenting, as an improved functional property, a higher gel strength at a neutral pH, is particularly advantageous.

Attempts to reduce the size of protein isolate and concentrate particles and to study the functional properties of the resulting compositions have already been made. For example, Sun et al. (Reduction of particle size based on superfine grinding: *Effects on structure, rheological and gelling properties of whey protein concentrate*, Journal of Food Engineering, Vol. 186, 2016, Pages 69-76) describe the milling of a whey protein concentrate using a nano-bead mill. Various properties of the proteins are studied, including the particle size, gel strengths at various pH values, coloring and structure using infrared techniques. As regards the gel strengths, milling results in protein compositions containing proteins, compared with proteins before milling, which have higher gel strengths at an acidic pH (4.5) and lower gel strengths at neutral (6.5) and basic (8.5) pH.

Hayakawa et al. (*Microparticulation by Jet Mill Grinding of Protein Powders and Effects on Hydrophobicity*, Journal of Food Science, Vol. 58, Issue No. 5, 1993, pages 1026-1029) describe the microparticulation of proteins of casein and egg white type, and also soybean fibers, using a jet mill. Said article does not describe leguminous plant proteins. It does not describe, either, the increase in gel strength of the proteins.

Liu et al. (*Ball-milling changed the physicochemical properties of SPI and its cold-set gels*, Journal of Food Engineering, Vol. 195, 2017, pages 158-165) describe the use of a ball mill such as a planet BM and a Mixer Mill MM400 on a soybean protein isolate, in order to slightly decrease the particle size (mean size of 80 µm). Although, however, the gel strength of this isolate under acidic conditions (in the presence of glucono-delta-lactone) could be increased by milling using a mill such as a Mixer Mill MM400, this increase remained very low (maximum increase of the order of 30%). Furthermore, milling using a mill such as a planet BM made no difference to the observed gel strengths. Moreover, said publication does not study the gel strength of proteins used at neutral pH.

GENERAL DESCRIPTION OF THE INVENTION

According to a first aspect of the invention, a leguminous plant protein composition, the leguminous plant being notably chosen from pea, lupin and faba bean, is proposed, characterized in that the gel strength of the protein composition according to test A is greater than 200 Pa, preferentially greater than 250 Pa, even more preferentially greater than 300 Pa and most preferentially greater than 350 Pa. In a preferential manner, the leguminous plant protein composition is a leguminous plant protein isolate and more preferentially a pea protein isolate.

According to another aspect, a process for producing a protein composition according to the invention is proposed, characterized in that it comprises the following steps:

1) providing leguminous plant seeds, preferentially chosen from pea, lupin and faba bean;
2) milling the seeds and producing an aqueous suspension;
3) separating out insoluble fractions using centrifugal force;
4) coagulating the proteins by heating at the isoelectric pH at a temperature of between 55° C.±2° C. and 65° C.±2° C., preferentially 60° C.±2° C., for a time of between 3.5 min and 4.5 min, preferentially 4 min;
5) collecting the coagulated protein floc by centrifugation;
6) adjusting the pH to a value of between 6±0.5 and 9±0.5;
7) optionally, heat treatment;
8) drying the coagulated protein floc;
9) milling the coagulated protein floc using a jet mill and drying in order to obtain a particle size D90 of less than 20 microns, preferentially less than 15 microns, even more preferentially less than 10 microns.

According to a last aspect of the invention, the industrial uses, in a food or pharmaceutical product, in particular the animal feed and human food uses, of the leguminous plant protein composition, preferentially of the leguminous plant protein isolate, chosen from pea, lupin and faba bean, even more preferentially of the pea protein isolate according to the invention, are proposed.

The invention will be better understood by means of the detailed description hereinbelow.

DETAILED DESCRIPTION OF THE INVENTION

According to a first aspect of the invention, a leguminous plant protein composition, the leguminous plant being notably chosen from pea, lupin and faba bean, is thus proposed, characterized in that the gel strength of the protein composition according to test A is greater than 200 Pa, preferentially greater than 250 Pa, even more preferentially greater than 300 Pa and most preferentially greater than 350 Pa. The leguminous plant is most preferentially pea. By way of example, the gel strength of the protein composition according to test A may be less than 450 Pa, for example less than 400 Pa. In a preferential manner, the leguminous plant protein composition is a leguminous plant protein isolate and more preferentially a pea protein isolate.

The term "protein composition" should be understood in the present patent application as meaning a composition obtained by extraction and refining, said composition including proteins, macromolecules formed from one or more polypeptide chains consisting of a sequence of amino acid residues linked together via peptide bonds. In the particular context of pea proteins, the present invention relates more particularly to globulins (about 50-60% of pea proteins). Pea globulins are mainly subdivided into three subfamilies: legumins, vicilins and convicilins.

The term "leguminous plant" should be understood in the present patent application as meaning the family of dicotyledon plants of the order *Fabales*. It is one of the most important families of flowering plants, the third ranking after *Orchidaceae* and *Asteraceae* regarding the number of species. It contains about 765 genera combining more than 19 500 species. Several leguminous plants are significant crop plants, such as soybean, beans, peas, chickpea, faba bean, groundnut, cultivated lentil, cultivated alfalfa, various clovers, broad beans, locust bean, liquorice and lupin.

The term "gelling power" means the functional property which consists of the capacity of a protein composition for forming a gel or a network, which increases the viscosity and generates a state of matter between the liquid and solid states. The term "gel strength" may also be used. To quantify this gelling power, it is thus necessary to generate this network and to evaluate its strength. To perform this quantification, in the present invention, test A is used, the description of which is as follows:

1) Solubilization at 60° C.±2° C. of the protein composition tested in water at 15%±2% of solids and at pH 7;
2) Stirring for 5 min at 60° C.±2° C.;
3) Cooling to 20° C.±2° C. and stirring for 24 hours at 350 rpm;
4) Analysis of the suspension with a controlled stress rheometer equipped with a concentric cylinder;
5) Measurement of the elastic moduli G' and the viscous moduli G" by applying the following temperature profile:
   a. Phase 1: Measurement of the parameter G'1 after stabilization at 20° C.±2° C. and heating from a temperature of 20° C.±2° C. to a temperature of 80° C.±2° C. in 10 minutes;
   b. Phase 2: stabilization at a temperature of 80° C.±2° C. for 110 minutes;
   c. Phase 3: cooling from a temperature of 80° C.±2° C. to a temperature of 20° C.±2° C. in 30 min and measurement of G'2 after stabilization at 20° C.±2° C.;
6) Calculation of the gelling power equal to G'2–G'1.

In a preferred manner, the controlled stress rheometers are chosen from the models DHR 2 (TA Instruments) and MCR 301 (Anton Paar), with a spindle of concentric cylinder type. They are equipped with a temperature regulation system based on the Peltier effect. In order to avoid evaporation problems at high temperature, liquid paraffin is added on top of the samples.

For the purposes of the invention, a "rheometer" is a laboratory machine for taking measurements regarding the rheology of a fluid or a gel. It applies a force to the sample. Generally of characteristic small dimensions (very small mechanical inertia of the rotor), it allows fundamental study of the mechanical properties of a liquid, a gel, a suspension, a paste, etc., in response to an applied force.

The "controlled stress" models make it possible, by the application of a sinusoidal stress (oscillation mode), to determine the intrinsic viscoelastic values of matter, which notably are dependent upon time (or angular velocity ω) and upon the temperature. In particular, this type of rheometer affords access to the complex modulus G*, which itself affords access to the moduli G' or elastic part and G" or viscous part.

The first three steps consist in resuspending the protein in water, using precise conditions making it possible to maximize the subsequent measurement.

The chosen water is preferentially reverse osmosis water, but drinking water may also be used.

Its temperature is 60° C.±2° C. during the initial resuspension (1st and 2nd steps) and then 20° C.±2° C. after solubilization for 24 h and cooling before the measurement (3rd step). In general and unless indicated otherwise, when a temperature is given in the present description, it always comprises a variation of ±2° C., for example 20° C.±2° C. or 80° C.±2° C.

A defined amount of protein is added to said water so as to obtain a suspension containing 15%±2% of solids. To do this, equipment such as beakers and stirring bars, well known to those skilled in the art, are used. A volume of 50 mL is stirred for at least 10 h at 350 rpm at room temperature. In general and unless indicated otherwise, the solids contents given in the present description always comprise a variation of ±2%, for example 15%±2%. The pH is adjusted to 7±0.5 using a pH-meter and acid-base reagents, as is well known in the prior art.

The fourth step consists in introducing the sample into the rheometer, and covering said sample with a thin layer of oil in order to limit the evaporation.

During the fifth step, the following temperature protocol is then applied: a. Phase 1: heating from a temperature of 20° C.±2° C. to a temperature of 80° C.±2° C. in 10 minute; b. Phase 2: stabilization at a temperature of 80° C.±2° C. over 110 minutes; c. Phase 3: cooling from a temperature of 80° C.±2° C. to a temperature of 20° C.±2° C. in 30 min.

The measurement of the parameter G' is performed continuously during this protocol and is recorded.

The sixth and last step of test A consists in exploiting the recording. Two values are extracted: G'1=value of G' at the start of phase 1 after stabilization at 20° C.±2° C. and G'2=value of G' at the end of phase 3 after stabilization at 20° C.±2° C.

The gelling power is equal to G'2−G'1.

In a preferential manner, the leguminous plant protein composition according to the invention has a protein content of greater than 80%, preferentially greater than 85%, even more preferentially greater than 90% by weight of solids relative to the total weight of solids.

The protein content is measured by any technique well known to those skilled in the art. Preferably, the total nitrogen is assayed (as a weight percentage of nitrogen relative to the total dry weight of the composition) and the result is multiplied by a coefficient of 6.25. This well-known methodology in the field of plant proteins is based on the observation that proteins contain an average of 16% nitrogen. Any method of assaying dry matter that is well known to those skilled in the art may also be used.

In an even more preferential manner, the protein composition has a particle size D90 of less than 20 microns, preferentially less than 15 microns, even more preferentially less than 10 microns.

In the present invention, the term "D90" means the particle size in microns separating two populations by number, containing respectively 90% and 10% of the total amount of particles of the protein composition.

For performing this D90 measurement, a laser particle size analyzer is preferentially used, even more preferentially the Mastersizer 2000 machine from the company Malvern. The parameters used are as follows: Use in the liquid route, dispersion in ethanol; Refractive index: 1.52; Absorption index: 0.1; no use of ultrasonication.

Preferentially, the protein composition according to the invention has high solubility at neutral pH. According to the present invention, test B is used to quantify the solubility of the protein composition. This test B consists of the following steps:

150 g of distilled water are introduced into a 400 mL beaker at a temperature of 20° C.±2° C. with stirring using a magnetic bar, and 5 g, accurately weighed, of leguminous plant protein sample to be tested are added. If necessary, the pH is adjusted to 7 with 0.1N NaOH or 0.1N HCl. Water is added to make up 200 g of water. The mixture is stirred for 30 minutes at 1000 rpm and centrifuged for 15 minutes at 3000×g. 25 g of the supernatant are collected and are introduced into a previously dried and tared crystallizing dish. The crystallizing dish is placed in a drying oven at 103° C.±2° C. for 1 hour. It is then placed in a desiccator (with a dehydrating agent) to cool to room temperature and is then weighed.

The solubility corresponds to the content of soluble solids, expressed as a weight percentage relative to the weight of the sample. The solubility is calculated using the following formula:

$$\%\ \text{solubility} = \frac{(m1 - m2) \times (200 + P)}{P1 \times P} \times 100 \qquad \text{[Math. 1]}$$

in which:

P=weight, in g, of sample=5 g m1=weight, in g, of the crystallizing dish after drying m2=weight, in g, of the empty crystallizing dish P1=weight, in g, of the collected sample=25 g Advantageously, the solubility of the protein composition of the invention according to test B ranges from 30% to 65%, for example from 33% to 62%, notably from 38% to 60%.

A further advantage of the invention is that it is possible to improve the gelling properties of pea proteins, while at the same time maintaining their solubility. However, these properties may appear poorly compatible: for example, increasing the solubility of a protein by proteolysis results in a loss of its gelling properties. Without being bound to any particular theory, this is explained by the fact that, generally, in order to form a protein gel, the proteins need to form a network after their aggregation. Therefore, since the gelling proteins are of a larger size, even after being redissolved, they usually show reduced solubility. The invention makes it possible, however, to reconcile the two properties.

According to another aspect, a process for producing a leguminous plant protein composition according to the invention is proposed, characterized in that it comprises the following steps:

1) providing leguminous plant seeds, preferentially chosen from pea, lupin and faba bean;
2) milling the seeds and producing an aqueous suspension;
3) separating out insoluble fractions using centrifugal force;
4) coagulating the proteins by heating at the isoelectric pH at a temperature of between 55° C.±2° C. and 65° C.±2° C., preferentially 60° C.±2° C., for a time of between 3.5 min and 4.5 min, preferentially 4 min;
5) collecting the coagulated protein floc by centrifugation;
6) adjusting the pH to a value of between 6±0.5 and 9±0.5;
7) optionally, heat treatment;
8) drying the coagulated protein floc;
9) milling the coagulated protein floc using a jet mill so as to obtain a particle size D90 of less than 20 microns, preferentially less than 15 microns, even more preferentially less than 10 microns.

The process thus starts with a step 1) of providing leguminous plant seeds, preferentially chosen from pea, lupin and faba bean.

When the leguminous plant chosen is pea, the peas used in step 1) may have been beforehand through steps well known to those skilled in the art, such as notably cleaning (removal of undesired particles such as stones, dead insects, soil residues, etc.) or even the removal of the external fibers of the peas (external cellulose hull) through a well-known step of "dehulling".

Treatments for improving the organoleptic properties such as dry heating (or roasting) or wet bleaching are also possible. For bleaching, the temperature is preferentially between 70° C.±2° C. and 90° C.±2° C. and the pH is adjusted to between 8±0.5 and 10±0.5, preferentially to 9±0.5. These conditions are maintained for 2 to 4 min, preferentially for 3 min.

The process according to the invention comprises a step 2) of milling the seeds and producing an aqueous suspension. If the seeds are already in the presence of water, the water is retained but may also be renewed, and the seeds are directly milled. If the seeds are dry, a meal is first produced, and it is then suspended in water.

The milling is performed by any type of suitable technology known to those skilled in the art, such as with ball mills, conical mills, helical mills, jet mills or rotor/rotor systems.

During milling, water may be added in a continuous or discontinuous manner, at the start, during or at the end of milling, so as to produce at the end of the step an aqueous suspension of milled peas with between 15% and 25% by weight of solids (SC), preferentially 20% by weight of SC, relative to the weight of said suspension.

At the end of milling, the pH can be checked. Preferably, the pH of the aqueous suspension of milled peas at the end of step 2 is adjusted to between 5.5±0.5 and 10±0.5, for example the adjusted pH is from 6±0.5 to 9±0.5. Alternatively, the pH is adjusted to between 8±0.5 and 10±0.5, for example the pH is adjusted to 9. pH correction may be performed by addition of acid and/or base, for example sodium hydroxide or hydrochloric acid.

The process according to the invention then consists of a step 3) of separating out the insoluble fractions using a centrifugal force. These fractions consist mainly of starch and of polysaccharides called "internal fibers". The proteins soluble in the supernatant are thus concentrated.

The process according to the invention comprises a step 4) of coagulating the proteins by heating at the isoelectric pH at a temperature of between 55° C.±2° C. and 65° C.±2° C., preferentially at 60° C.±2° C., for a time of between 3.5 min and 4.5 min, preferentially 4 min. The aim here is to separate the pea proteins of interest from the other components of the supernatant of step 3). Such a process example is described, for instance, in EP1400537 of the Applicant, from paragraph 127 to paragraph 143. It is essential to adequately control the time/temperature protocol: as will be illustrated hereinbelow in the Example section, these parameters are paramount for producing a gelling protein composition according to the invention.

The following step 5) consists in collecting the coagulated protein floc by centrifugation. The solid fractions with concentrated proteins are thus separated from the liquid fractions with concentrated sugars and salts.

In a step 6), the floc is resuspended in water and its pH is adjusted to a value of between 6±0.5 and 9±0.5. The solids content is adjusted to between 10% and 20%, preferentially 15% by weight of solids relative to the weight of said suspension. The pH is adjusted using any acidic and basic reagent(s). The use of ascorbic acid, citric acid, potassium hydroxide and sodium hydroxide, is preferred.

It is possible to perform an optional step 7), which consist of a heat treatment aimed at ensuring the microbiological quality of the protein. This heat treatment may also be used to functionalize the protein composition. It is therefore preferentially performed with a conventional protocol of 100° C.±2° C. to 160° C.±2° C. for 0.01 s to 3 s, preferentially between 1 and 2 seconds, immediately followed by cooling.

In a step 8), the coagulated protein floc is dried to reach a solids content greater than 80%, preferentially greater than 90% by weight of solids relative to the weight of said solids. To this end, any technique well known to those skilled in the art can be used, for instance freeze-drying or atomization. Atomization is the preferred technology, in particular multiple-effect atomization.

The solids content is measured by any technique well known to those skilled in the art. Preferentially, the "desiccation" method is used: It consists in determining the amount of water evaporated by heating a known amount of a sample of known mass: the sample is first weighed and a mass m1 in g is measured; the water is evaporated off by placing the sample in a heated chamber until the sample mass has stabilized, the water being totally evaporated (preferably, the temperature is 105° C. under atmospheric pressure), the final sample is weighed and a mass m2 in g is measured. The solids content is obtained by the following calculation: (m2/m1)*100.

The last step 9) is, just like the preceding step 4), essential for producing the protein composition according to the invention. It consists in milling the coagulated protein floc and drying to obtain a particle size D90 of less than 20 microns, preferentially less than 15 microns, even more preferentially less than 10 microns. In this step of the process of the invention, a jet mill is used. However, the use of an opposite jet mill, even more preferentially a Netzsch CGS10 mill, is preferred. This type of mill brings about size reduction by generation of collisions: the particles, accelerated by high-speed gas jets, are fragmented via impacts.

In an advantageous process of the invention, the gel strength of the protein composition according to test A is at least 150% of the gel strength of the dried protein floc in step 8, advantageously at least 200%, for example at least 300%. The gel strength of the protein composition according to test A may be, for example, at most 600% of the gel strength of the dried protein floc in step 8.

As mentioned above, one of the advantages of the invention is that the protein solubility can be maintained during the milling step. Advantageously, the solubility of the protein composition according to test B is at least 75% of the solubility of the dried protein floc in step 8, advantageously at least 90%.

An advantage of the invention is that the protein compositions of the invention can have a higher gel strength at various pH values, and in particular at neutral pH, as under the conditions of test A. The use of the protein composition according to the invention is advantageous in any type of food or pharmaceutical product: the food or pharmaceutical product may have a pH ranging from 4 to 9, for example from 5 to 8.5, notably from 6 to 8 or about 7.

According to a last aspect of the invention, the industrial uses, in particular the animal feed and human food uses, of the leguminous plant protein composition, preferentially of the leguminous plant protein isolate, chosen from pea, lupin and faba bean, even more preferentially of the pea protein isolate according to the invention, are proposed.

By virtue of its improved gelling power, the protein composition according to the invention is particularly suited to food applications such as vegetable yoghurts or meat analogs. It may notably be used in meat or fish substitutes. It may notably be used as a binder, for example as a binder useful for the manufacture of meat or fish substitutes.

Another aspect of the invention is therefore a meat or fish substitute comprising the protein composition of the invention.

The invention will be better understood by means of the nonlimiting examples hereinbelow.

EXAMPLES

Example 1

Production of a Leguminous Plant Protein Composition According to the Invention After dehulling the external fibers using a hammer mill, the pea seeds are milled to produce a meal. This meal is then soaked in water to a final concentration of 25% by weight of solids relative to the weight of said suspension, at a pH of 6.5, for 30 minutes at room temperature. The meal suspension at 25% by weight of solids is then introduced into a series of hydrocyclones, which separate a light phase consisting of a mixture of proteins, internal fibers (pulps) and soluble matter and a heavy phase, containing starch. The light phase at the outlet of the hydrocyclones is then adjusted to a solids content of 10.7% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers.

The proteins are coagulated at their isoelectric point by adjusting the light phase at the outlet of the centrifugal decanter to a pH of 4.6 and heating this solution at 60° C. for 4 min. After coagulation of the proteins, a protein floc is obtained. This protein floc is resuspended at 15.1% of solids relative to the weight of said suspension in drinking water. The pH of the suspension is adjusted to a value of 7 with potassium hydroxide. A heat treatment is finally performed at 130° C. for 0.4 s followed by flash cooling. The suspension is finally atomized in a NIRO MSD multiple-effect atomizer, with a temperature of the air inlet of 180° C., and of the outlet of 80° C. The obtained powder contained 92.3% of solids relative to the total weight of solids, of which 85.5% were proteins. This powder is called "Base for composition according to the invention".

This powder was then milled using a Netzsch CGS10 opposite jet mill to produce a powder with a particle size D90 of 7.3 microns.

The pulverulent protein composition obtained is called "Micronized protein composition according to the invention".

Example 2

Comparative Example Aimed at Demonstrating the Influence of the Heating Protocol of the Protein Composition During the Coagulation Thereof This example is aimed at showing the impact of the coagulation protocol on the functionalities of the protein composition according to the invention.

After dehulling the external fibers using a hammer mill, the pea seeds are milled to produce a meal. This meal is then soaked in water to a final concentration of 25.1% by weight of solids relative to the weight of said suspension, at a pH of 6.5, for 30 minutes at room temperature. The meal suspension at 25% by weight of solids is then introduced into a series of hydrocyclones, which separate a light phase consisting of a mixture of proteins, internal fibers (pulps) and soluble matter and a heavy phase, containing starch. The light phase at the outlet of the hydrocyclones is then adjusted to a solids content of 11.2% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers.

The proteins are coagulated at their isoelectric point by adjusting the light phase at the outlet of the centrifugal decanter to a pH of 4.6 and heating this solution at 70° C. for 4 min. After coagulation of the proteins, a protein floc is obtained. This protein floc is resuspended at 14.9% of solids relative to the weight of said suspension in drinking water. The pH of the suspension is adjusted to a value of 7 with potassium hydroxide. A heat treatment is finally performed at 130° C. for 0.4 s followed by flash cooling. The suspension is finally atomized in a NIRO MSD multiple-effect atomizer, with a temperature of the air inlet of 180° C., and of the outlet of 80° C. The obtained powder contained 91.9% of solids relative to the total weight of solids, of which 84.9% were proteins. This powder is called "Base for comparative protein composition No. 1".

This powder was then milled using a Netzsch CGS10 opposite jet mill to produce a powder with a particle size D90 of 8.2 microns.

The pulverulent protein composition obtained is called "Comparative micronized protein composition No. 1".

Example 3

Comparison of the Various Protein Compositions Obtained in Examples 1 and 2

Test A as described previously, and also the solids content and the protein content, are used to compare the protein compositions:

TABLE 1

| | Base for protein composition according to the invention | Micronized protein composition according to the invention | Base for comparative protein composition No. 1 | Comparative micronized protein composition No. 1 |
|---|---|---|---|---|
| Solids content (%) | 92.3 | 96.7 | 91.9 | 96.5 |
| Protein content (% Solids) | 85.5 | 85.0 | 84.9 | 86.1 |
| Gelling power (Pa) according to test A | 98 | 375 | 103 | 109 |
| D90 (in microns) | 233.2 | 7.3 | 187.1 | 8.2 |

Table 1 above shows unequivocally the extreme importance of the synergy between the coagulation temperature protocol and the reduction of the particle size down to a particle size D90 of less than 10 microns, in order to maximize the gelling power. The gelling power of the micronized protein composition according to the present invention is about 4 times greater than that of the base for protein composition according to the invention, the comparative base for protein composition No. 1 and the comparative micronized protein composition No. 1.

Example 4

Production of a Leguminous Plant Protein Composition According to the Invention After dehulling the external fibers using a hammer mill, the pea seeds are milled to produce a meal. This meal is then soaked in water to a final concentration of 25% by weight of solids relative to the weight of said suspension, at a pH of 6.5, for 30 minutes at room temperature. The meal suspension at 25% by weight of solids is then introduced into a series of hydrocyclones, which separate a light phase consisting of a mixture of proteins, internal fibers (pulps) and soluble matter and a heavy phase, containing starch. The light phase at the outlet of the hydrocyclones is then adjusted to a solids content of 10% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers.

The proteins are coagulated at their isoelectric point by adjusting the light phase at the outlet of the centrifugal decanter to a pH of 5.0 and heating this solution at 60° C. for 4 min. After coagulation of the proteins, a protein floc is obtained. This protein floc is resuspended at 18% of solids relative to the weight of said suspension in drinking water. The pH of the suspension is adjusted to a value of 7 with sodium hydroxide. A heat treatment is finally performed at 130° C. for 0.4 s followed by flash cooling. The suspension is finally atomized in a NIRO MSD multiple-effect atomizer, with a temperature of the air inlet of 180° C., and of the outlet of 80° C. The obtained powder contained 93.2% of solids relative to the total weight of solids, of which 80.7% were proteins. This powder is called "Base 2 for composition according to the invention".

This powder was then milled using a Netzsch CGS10 opposite jet mill for two different time periods, so as to produce a first powder with a particle size D90 of 16.9 microns and a second powder with a particle size D90 of 7.9 microns. The pulverulent protein compositions obtained are called "Micronized protein composition 2 according to the invention" and "Micronized protein composition 3 according to the invention", respectively.

Tests A and B as described previously, and also the solids content and the protein content, are used to compare the protein compositions:

TABLE 2

| | Base 2 for protein composition according to the invention | Micronized protein composition 2 according to the invention | Micronized protein composition 3 according to the invention |
|---|---|---|---|
| Solids content (%) | 93.2 | 96.2 | 95.6 |
| Protein content (% Solids) | 80.7 | 81.3 | 81.7 |
| Gelling power (Pa) according to test A | 112 | 229 | 235 |
| Solubility (%) according to Test B | 43.5 | 33.8 | 42.7 |
| D90 (in microns) | 253.2 | 16.9 | 7.9 |

Table 2 above shows again that it is possible to maximize the gelling power. The gelling power of the micronized protein compositions according to the present invention is more than twice as high. Moreover, it is also possible to maintain the protein solubility.

The invention claimed is:

1. A process for producing a protein composition, comprising the following steps:
   1) providing leguminous plant seeds chosen from pea, lupin and faba bean;
   2) milling the seeds and producing an aqueous suspension;
   3) separating out insoluble fractions using centrifugal force;
   4) coagulating a protein floc by heating at the isoelectric pH at a temperature of between 55° C.±2° C. and 65° C.±2° C., for a time of between 3.5 min and 4.5 min;
   5) collecting the coagulated protein floc by centrifugation;
   6) adjusting the pH to a value of between 6±0.4 and 9±0.5;
   7) optionally, heat treatment;
   8) drying the coagulated protein floc; and
   9) milling the coagulated protein floc and drying using a jet mill in order to obtain a particle size D90 of less than 20 microns to obtain the protein composition, wherein the protein composition has a gel strength according to test A of greater than 200 Pa, and wherein the protein composition has a protein content of greater than 80% by weight of solids relative to the total weight of solids.

2. The process as claimed in claim 1, wherein the heat treatment in step 7 consists of a protocol of from 100° C.±2° C. to 160° C.±2° C. for 0.01 s to 3 s, immediately followed by cooling.

3. The process as claimed in claim 1, wherein the drying in step 8 is performed by atomization.

4. The process as claimed in claim 1, wherein the milling in step 9 is performed using an opposite jet mill.

5. The process as claimed in claim 1, wherein the gel strength of the protein composition according to test A is at least 150% of the gel strength of the dried protein floc in step 8.

6. A leguminous plant protein composition, comprising leguminous plant seed, wherein the leguminous plant seed is selected from the group consisting of pea, lupin and faba bean, made by a process comprising the step of coagulating a leguminous plant by heating at the isoelectric pH at a temperature of from 55° C.±2° C. to 65° C.±2° C. for a time of from 3.5 min to 4.5 min, wherein:

the protein composition has a gel strength according to test A of greater than 200 Pa, the protein composition has a protein content of greater than 80% by weight of solids relative to the total weight of solids, and the protein composition has a particle size D90 of less than 20 microns.

7. A leguminous plant protein composition, comprising leguminous plant seed, wherein the leguminous plant seed is selected from the group consisting of pea, lupin and faba bean, made by a process comprising the steps of:
   1) providing leguminous plant seeds;
   2) milling the seeds and producing an aqueous suspension;
   3) separating out insoluble fractions using centrifugal force;

4) coagulating a protein floc by heating at the isoelectric pH at a temperature of from 55° C.±2° C. to 65° C.±2° C. for a time from 3.5 min to 4.5 min;
5) collecting the coagulated protein floc by centrifugation;
6) adjusting the pH to a value from 6±0.5 to 9±0.5;
7) optionally, heat treatment;
8) drying the coagulated protein floc; and
9) milling the coagulated protein floc and drying using a jet mill in order to obtain a particle size D90 of less than 20 microns, wherein:

the protein composition has a gel strength according to test A of greater than 200 Pa, the protein composition has a protein content of greater than 80% by weight of solids relative to the total weight of solids, and the protein composition has a particle size D90 of less than 20 microns.

8. The leguminous plant protein composition as claimed in claim 6, wherein it has a protein content of greater than 85% by weight of solids relative to the total weight of solids.

9. The leguminous plant protein composition as claimed in claim 6, wherein it has a particle size D90 of less than 15 microns.

10. The leguminous plant protein composition as claimed in claim 6, wherein it has a solubility according to test B ranging from 30% to 65%.

11. The leguminous plant protein composition as claimed in claim 6, wherein it has a protein content of greater than 90% by weight of solids relative to the total weight of solids.

12. The leguminous plant protein composition as claimed in claim 6, wherein it has a particle size D90 of less than 10 microns.

13. The leguminous plant protein composition as claimed in claim 6, wherein it has a solubility according to test B ranging from 33% to 62%.

14. The leguminous plant protein composition as claimed in claim 6, wherein it has a solubility according to test B ranging from 38% to 60%.

15. A food or pharmaceutical product, comprising the leguminous plant protein composition according to claim 6.

16. The food or pharmaceutical product as claimed in claim 15, in which the food or pharmaceutical product has a pH of from 5 to 8.5.

17. The food or pharmaceutical product as claimed in claim 15, in which the food or pharmaceutical product has a pH of from 6 to 8.

18. The food or pharmaceutical product as claimed in claim 15, in which the food or pharmaceutical product has a pH of about 7.

* * * * *